June 5, 1945.　　B. R. CRAMPTON　　2,377,541

FAUCET HANDLE

Filed Aug. 7, 1944

Inventor
Basil R. Crampton
By Liverance and Van Antwerp
Attorneys

Patented June 5, 1945

2,377,541

UNITED STATES PATENT OFFICE 2,377,541

FAUCET HANDLE

Basil R. Crampton, Grand Rapids, Mich.

Application August 7, 1944, Serial No. 548,435

9 Claims. (Cl. 287—53)

This invention is directed to universal faucet handles adapted to be very quickly and readily applied to the stems of faucet valves, the rotation of said stems moving the valves to open and closed positions.

The present invention is for the production of a handle as noted, of a simple and very effective construction which is strong and durable and may be readily attached to the faucet valve stem at the outer end thereof where it projects beyond the faucet valve housing. Such handle is applied quickly and, when in place, there is a firm connection made between the handle and stem and one which will not disconnect under all normal use thereof.

An understanding of the invention may be had from the following description taken in connection with the accompanying drawing, in which, Fig. 1 is an elevation of the handle made in accordance with my invention.

Like reference characters refer to like parts in the different figures of the drawing.

Figure 1:
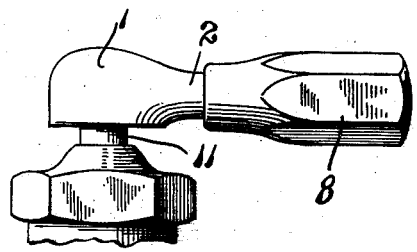
Figure 2:
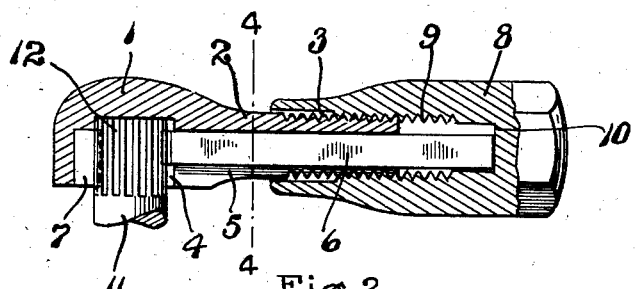
Fig. 2 is a somewhat enlarged longitudinal section thereof.

In the construction of a handle one member thereof preferably cast, is provided with a head 1 at one end from which an integral stem 2 extends at one side, the outer end portion of which is exteriorly threaded, as at 3. The head at its inner side is cast or otherwise formed with a cylindrical recess 4 therein open at its inner side and extending toward the outer side of the head, but terminating short thereof. Outwardly from said recess the said member is slotted lengthwise of the stem and at its inner side to provide a longitudinal slot 5, the longitudinal center line of which proximately crosses the axis of the recess at 4.

In the slot 5 a bar 6 preferably of steel and of a rectangular cross section is located. The bar is longer than the slot 5 and extends beyond the end of the threaded portion 3 of the stem and at its inner end has its sides converge toward each other to provide a substantial knife edge extending the full width of the bar. In the head 1 substantially diametrically opposite the inner end of the slot 5 a slot is cast or otherwise provided into which a short preferably wedge shaped bar 7 is driven, its inner edge being brought to a point for the full length of the bar 7; and the inner portion of the wedge member 7 projects a short distance into said cylindrical recess 4 of the handle. The bar 6 and the member 7 are preferably of steel and may be hardened. The handle is completed by a second handle member 8 which is axially bored from its inner end toward but short of its outer end, and a portion of said boring is interiorly threaded as at 9 so that it may screw onto the threaded portion 3 of the stem 2, with the outer end of the bar 6 engaging against the bottom 10 of the recess in the handle member 8.

Figure 3:
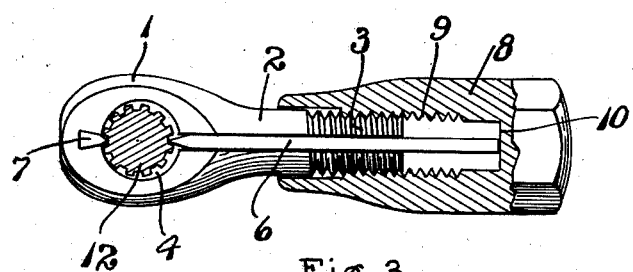
Fig. 3 is an under plan view partly in section.
Figure 4:
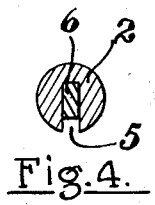
Fig. 4 is a transverse section on the plane of line 4—4 of Fig. 2.

The diameter of the recess at 4 is sufficiently large to receive any of the projecting end portions of the standard stems 11 of valves which control the flow of water in connection with faucets. The stems 11 at their outer end portions, in standard practice, are exteriorly fluted, as indicated at 12, with a plurality of radially extending ribs separated from adjacent ribs by longitudinal grooves as best shown in Fig. 3. The stems which are used with standard plumbing fixtures are not all of the same diameter, varying slightly in this respect, and also said stems have varying numbers of ribs and separating grooves between them at their outer fluted portions.

In connecting the handle the outer handle member 8 is unscrewed sufficiently that the inner pointed end of the bar 6 may be withdrawn from the recess 4 as far as necessary. The head 1 is then placed over the upper fluted end portion 12 of the stem 11 and the outer handle member 8 screwed onto the threaded portion 3 of stem 2, forcing the bar 6 longitudinally toward the valve stem 11 with the pointed end of said bar engaging the stem between two of the ribs, and pressing the stem against the member 7, its pointed edge likewise passing between two of said ribs. The handle member 8 is preferably shaped so that it may be readily engaged by a tool for turning whereby the requisite force may be transmitted to the bar 6 to force its substantially knife-like edge into the stem and, likewise, cause the similar edge of the member 7 to cut into and indent the stem substantially diametrically opposite. Of course the application of force to the extent specified need not be carried to any extreme as the entrance of the pointed edge portions of the bar 6 and member 7 into grooves between the ribs at the fluted portion of the stem provides a sufficiently strong connection for turning the valve. In practice however a sufficient pressure should be used that a firm connection is made such that the handle cannot normally be removed except of course by unscrewing the outer handle member 8.

Faucet handles in plumbing fixtures are subjected many times to rough usage, become broken and have to be replaced. The handle structure which has been described is available for replacement purposes for any and all broken faucet handles or other faucet handles which for any reason require replacement, being designed for and in practice a handle available for universal replacement purposes. Of course the handle is also equally available for initial attachment to the valve stems of faucets and is not to be limited solely to replacement purposes.

This handle structure is strong and durable, economically manufactured, easily assembled and may be attached to a faucet valve stem very quickly and readily.

The invention is defined in the appended claims and is to be considered comprehensive of all forms of structure coming within their scope.

I claim:

1. A handle for faucets or the like comprising, a handle member having a socket opening therein into which the end of the valve stem of a faucet is insertable, said handle member having a longitudinal slot therein extending from the opening to the end of the member, a stem engaging member carried by said handle member at the side of the opening therein opposite said slot, said stem engaging member extending into said opening and having a pointed edge lengthwise thereof within the opening parallel to the length of said opening, a bar located in the slot having a pointed edge parallel to the length of the opening in substantially diametric opposition to the edge of said first stem engaging member, and a second handle member threaded onto the first handle member, said second handle member having an interiorly threaded opening against the bottom of which the end of the bar bears, whereby it may be moved inwardly upon rotative movement of the second handle member upon the first handle member.

2. A handle for faucets or the like comprising a handle member having a cylindrical socket opening adjacent one end and extending from its inner side toward and short of the outer side thereof, said opening being adapted to receive the stem of a faucet valve, a substantially wedge shaped stem engaging member carried by said handle member in a position substantially parallel to the axis of the socket and having a triangular shaped edge portion extending into said socket opening, said handle member at the opposite side of the socket opening having a longitudinal slot extending from the opening to the end of the handle member, a bar located in said slot, the end thereof at said socket opening having a pointed edge adapted to be moved inwardly into said socket opening, a second handle member mounted at the outer end portion of said first handle member with means connecting the two handle members for adjustment of the second handle member on the first handle member inwardly and outwardly, said second handle member engaging the outer end of said bar whereby upon inward adjustment the bar is moved inwardly, as specified.

3. A handle for faucets or the like comprising, a handle member having a cylindrical socket opening adjacent its inner end and open at one side thereof and extending toward but short of the outer side of the member, said handle member having a longitudinal slot therein extending from said socket to the outer end of the member, a bar located in said slot having a substantially knife edge at its inner end, a second handle member mounted on the first handle member, means for adjusting said bar inwardly, whereby when the first handle member is placed over the stem of a faucet valve with said stem located in said socket opening said knife edge at the end of a bar engages one side of said stem, and stem engaging means carried by the first socket member at the opposite side of said socket opening and against which said valve stem is pressed upon the adjustment of the bar inwardly, as specified.

4. A handle for faucets or the like comprising, a handle member having a valve stem receiving socket opening at its inner valve stem engaging end, means fixedly carried by said handle member and projecting into said socket opening, movable stem engaging means carried by said handle member at the opposite side of said socket opening, and a second handle member threaded upon the outer end portion of said first handle member engaging said last mentioned means for moving it inwardly into said socket opening upon turning said second handle member in one direction, whereby a valve stem inserted into said socket opening is engaged against said movable stem engaging means at one side thereof and is forced against said fixed stem engaging means at the opposing side of the stem.

5. A handle for faucets or the like comprising, inner and outer handle members, said inner member at its inner end having a socket opening for the reception of the end of a faucet valve stem, fixed means projecting into said socket opening adapted to engage a side of a valve stem inserted therein, movable means carried by said inner member adapted to be moved at one end into said socket opening and against the opposite side of the stem, and means for adjustably mounting the outer handle member upon the first handle member and in association with said movable means to move the same inwardly against the stem upon adjustment of the second handle member in one direction, and to release it upon adjustment in the opposite direction.

6. A handle for faucets or the like comprising, a handle member having a socket opening therein into which the end of the valve stem of a faucet is insertable, a stem engaging member mounted in fixed relation to said handle member at one side of the socket opening and having a portion with a pointed edge located parallel to the length of the socket opening projecting thereinto, a second stem engaging member mounted on said handle member opposite said fixed member and having a pointed edge portion paralleling the axis of the socket opening and means for forcing said second member inwardly to engage against one side of a faucet valve stem inserted in said socket opening and force said stem against the opposite stem engaging member.

7. A handle for faucets or the like comprising, a handle member having a cylindrical socket opening adjacent one end thereof and extending from the inner side of said handle member toward but short of the outer side thereof, the axis of said socket opening being substantially perpendicular to the length of the handle member, an end portion of a stem of a faucet valve being freely insertable into said socket opening, two valve stem engaging members mounted on said handle member at substantially diametrically opposed sides of the socket opening, one at least of said stem engaging members being adjustable in a direction toward an inserted valve stem, said stem engaging members having each a pointed inner edge portion paralleling the axis of the socket opening and means for forcing the adjustable stem engaging member into engagement with said valve stem to move said stem into engagement with the other of the engaging members.

8. A faucet handle having a socket opening into which the fluted end portion of a faucet valve stem is adapted to be inserted, a bar connected with said handle and extending lengthwise of and at one side of the socket opening and having a projecting portion extending into said opening adapted to enter between flutes on said stem, a member movably mounted opposite said bar and having an end to engage between flutes on said stem at the opposite side thereof, and means for forcing said member against the stem of a faucet valve located in said socket.

9. A faucet handle having a socket opening into which the end portion of a faucet valve stem may be inserted, a member having a chisel edge movably mounted on said handle, said edge being adapted to be moved into said socket opening to engage with a faucet valve stem therewithin, said edge of said member being substantially parallel to the axis of the opening and means for moving said member to force said edge thereof against the stem of a faucet valve located in said socket.

BASIL R. CRAMPTON.